Feb. 9, 1971 D. C. GLENN 3,561,828
ROLLING ELEMENT BEARINGS
Original Filed Nov. 28, 1967

INVENTOR
DEAN C. GLENN
BY Norman T. Musial
Gene E. Shook ATTORNEYS

United States Patent Office

3,561,828
Patented Feb. 9, 1971

---

3,561,828
ROLLING ELEMENT BEARINGS
Dean C. Glenn, League City, Tex., assignor to the United States of America as represented by the Administrator of the National Aeronautics and Space Administration
Original application Nov. 28, 1967, Ser. No. 686,344, now Patent No. 3,500,525, dated Mar. 17, 1970. Divided and this application Apr. 10, 1969, Ser. No. 840,870
Int. Cl. F16c 33/66
U.S. Cl. 308—187            1 Claim

ABSTRACT OF THE DISCLOSURE

A solid film lubricant is applied to components of rolling element bearings having porous retainers prior to use in a vacuum.

ORIGIN OF THE INVENTION

The invention described herein was made by an employee of the United States Government and may be manufactured and used by or for the Government for Governmental purposes without the payment of any royalties thereon or therefor.

STATEMENT OF COPENDENCY

This is a division of application Ser. No. 686,344 filed Nov. 28, 1967, now U.S. Pat. No. 3,500,525.

BACKGROUND OF THE INVENTION

This invention is concerned with improved rolling element bearings for use in ultrahigh vacuum environments. The invention is particularly directed to such bearings which are capable of providing low torques and a small temperature rise during operation.

Solid lubricants have been used for lubricating rolling-element bearings in vacuum operations. The retainer or cage which was fabricated from a solid lubricating material functioned to space the rolling elements and to provide lubrication. Thin films of the retainer material were transferred to the rolling elements by the rubbing action of the elements in the retainer pocket as the bearing rotated. The lubricant was subsequently transferred by the rolling elements to the inner and outer bearing races. Materials used for such retainers were reinforced and filled plastics, such as glass filled polyetetrafluoroethylene.

High bearing torques and high operating temperatures were encountered in these prior art bearings. Optical systems and electronic components malfunctioned because of contamination by the bearing lubricant.

SUMMARY OF THE INVENTION

These problems have been solved by a rolling element bearing constructed in accordance with the present invention. The bearing has rolling elements positioned by a retainer or cage fabricated from a porous metal. A solid lubricant is burnished on the components.

OBJECTS OF THE INVENTION

It is, therefore, an object of the present invention to provide a rolling element bearing for operation in ultrahigh vacuum environment of about $10^{-11}$ Torr.

Another object of the invention is to provide an improved rolling element bearing for operating at low torques and small temperature rises.

A further object of the invention is to provide a bearing for use in an ultrahigh vacuum environment which does not require containers, baffles or labyrinths to restrict evaporative losses.

These and other objects and advantages of the invention will be apparent from the specification which follows.

DESCRIPTION OF THE PREFERRED EMBODIMENT

Figure 1:
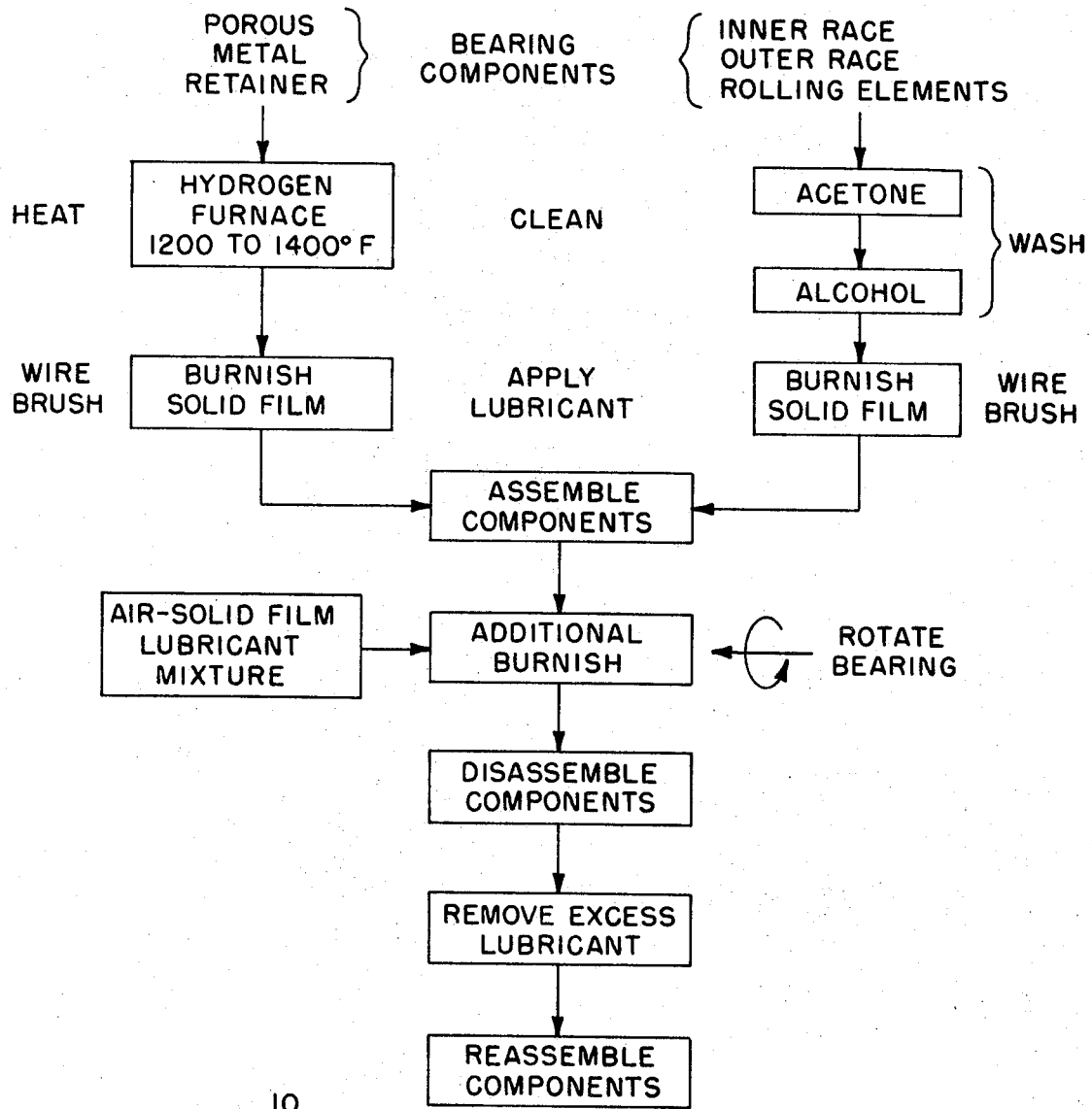
FIG. 1 is a flow sheet illustrating diagrammatically a process for making rolling element bearings in accordance with the invention.
Figure 2:
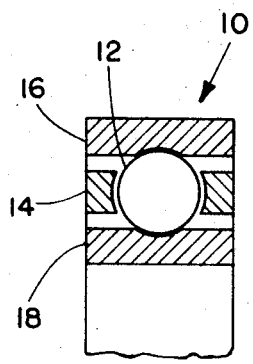
FIG. 2 is a sectional view of a bearing fabricated in accordance with the invention.

A bearing 10 made in accordance with the invention has rolling elements 12, such as balls or rollers, spaced by a retainer or cage 14. Both the rolling elements and the retainer are positioned between an outer race 16 and an inner race 18 in a conventional manner. The races 16, 18 and rolling elements 12 are preferably fabricated from 440 stainless steel. However, other suitable bearing steels may be utilized.

In accordance with the present invention, the retainer or cage 14 is fabricated from porous bronze or copper-tin alloy. Contaminants, such as oils or other organics, are removed from the retainer after fabrication. This is accomplished by placing the retainer in a hydrogen furnace at a temperature of 1200 to 1400° F. Care is taken to make certain that no contaminants contact with the retainer after cleaning and prior to bearing assembly. The inner race 18, outer race 16, and rolling elements 12 are cleaned first with acetone and then with alcohol.

A solid film lubricant is then applied to all of the bearing components in preparation for vacuum operation. It has been found that burnishing with a wire brush is satisfactory for this application.

Molybdenum disulfide is preferably applied in this manner. However, other solid film lubricants may be burnished onto the components. These include molybdenum diselenide, tungsten disulfide, tungsten diselenide, niobium disulfide and niobium dieselenide.

The bearing 10 is then assembled in a conventional manner. Additional burnishing of inaccessible regions, such as the rolling element pockets in the cage 14, is accomplished by forcing an air-molybdenum disulfide mixture into the bearing while it is rotating.

The bearing is then disassembled, and the excess solid film lubricant powder is removed by wiping. The bearing is then reassembled for use in a vacuum environment.

While several embodiments of the invention have been described, it will be appreciated that various modifications may be made to the bearing without departing from the spirit of the invention or the scope of the subjoined claim.

What is claimed is:

1. A rolling element bearing for use in an ultra high vacuum comprising
    spaced steel races having a film of solid lubricant thereon, said races being substantially free of contaminants,
    a plurality of steel rolling elements between said spaced steel races, said rolling elements being substantially free of contaminants and having a film of solid lubricant thereon, and a porous metal retainer for spacing said rolling elements between said steel races, said retainer being substantially free of contaminants and having a solid lubricant apart from the solid lubricant of the races and rolling elements burnished thereinto.

References Cited

UNITED STATES PATENTS 2,569,531  10/1957  Kunzog _____ 308—PM

FOREIGN PATENTS

| 314,736 | 10/1956 | Switzerland | 308—L |
| 555,519 | 8/1943 | Great Britain | 308—L |
| 784,165 | 10/1957 | Great Britain | 308—L |
| 677,240 | 8/1952 | Great Britain | 308—L |

FREDRICK L. MATTESON, Jr., Primary Examiner

FRANK SUSKO, Assistant Examiner